(12) United States Patent
Adam

(10) Patent No.: US 7,194,381 B2
(45) Date of Patent: Mar. 20, 2007

(54) METHOD FOR EVALUATING THE OPERATING CONDITIONS OF A MACHINE OR AN INSTALLATION

(75) Inventor: Gottfried Adam, Neunkirchen-Seelscheid (DE)

(73) Assignee: Siemens Aktiengesellschaft, Munich (DE)

( * ) Notice: Subject to any disclaimer, the term of this patent is extended or adjusted under 35 U.S.C. 154(b) by 674 days.

(21) Appl. No.: 10/648,930

(22) Filed: Aug. 27, 2003

(65) Prior Publication Data

US 2004/0073416 A1 Apr. 15, 2004

(30) Foreign Application Priority Data

Aug. 30, 2002 (EP) .................................. 02019455

(51) Int. Cl.
*G06F 11/00* (2006.01)

(52) U.S. Cl. ...................................................... 702/182
(58) Field of Classification Search ................ 702/182
See application file for complete search history.

(56) References Cited

U.S. PATENT DOCUMENTS 4,590,562 A 5/1986 Zwicke
7,065,471 B2 * 6/2006 Gotoh et al. ................ 702/183

* cited by examiner

*Primary Examiner*—John Barlow
*Assistant Examiner*—Cindy D. Khuu

(57) ABSTRACT

A method for evaluating and modifying the operating conditions of a machine or an installation includes measuring at least one parameter a number of times to create a database, of the parameter, determining an extrapolation range, performing an extrapolation in the range, and determining a measure of quality, K, of the extrapolation calculated on the basis of the database. K is a function of at least two variables. The parameter value is controlled so that the value will be retained within a limit.

16 Claims, 4 Drawing Sheets

METHOD FOR EVALUATING THE OPERATING CONDITIONS OF A MACHINE OR AN INSTALLATION

CROSS REFERENCE TO RELATED APPLICATIONS

This application claims priority of the European application No. 02019455.1 EP, filed Aug. 30, 2002 under the European Patent Convention and which is incorporated by reference herein in its entirety.

FIELD OF INVENTION

The invention relates to a method for evaluating the operating conditions of a machine or an installation.

BACKGROUND OF INVENTION

Until now the operating conditions of a machine or an installation were evaluated using visual extrapolations of a, for example, critical measurement value pattern and/or subjective evaluations of the impact on parameters of the machine or the installation, in order to estimate the operating conditions of a machine or an installation and to respond accordingly by changing or otherwise influencing the parameter according to the evaluation, for example by predetermining a target value for parameters.

In this process adjustment/regression functions of a database were adjusted and an optimization process was carried out by iterative selection of curve functions, with the maximum correlation coefficient. The curvature pattern of such an adjusted curve does not necessarily have to correspond to that of the database. The correlation coefficient r (maximum value=1, minimum value=−1) can only be used as an adjustment quality criterion under certain conditions, as this value depends not only on the adjustment quality of the curve function used but also on the gradient of the curve function used. If the gradient, for example, of a linear adjustment tends toward zero, r also follows this trend, regardless of the scatter of the individual curve points.

This means that r cannot be used as a measure of quality for an extrapolation.

Generation tools for evaluating the operating conditions of a machine or an installation have to satisfy certain minimum requirements, so that an evaluation of the extrapolation result is possible in respect of Predictive reliability Variables influencing predictive dependability Traceability of the prediction.

Naturally any prediction is subject to uncertainty and its measure of quality for assessing forecast alarms/exceeded limit values and as a basis for decision for resulting, e.g. automated, actions is extremely important. In addition, in the case of a cyclically generated method for evaluating the operating conditions of a machine or an installation in a specific, e.g. measurement context, the change in a measure of quality over time can also be seen as a trend and can therefore also offer additional conclusions about the time of occurrence of the forecast event, e.g. the exceeding of a limit value, in order to ensure the operational dependability of the machine or the installation.

Estimating the reliability of an extrapolation is of central significance, as evaluations of damage symptoms, the exceeding of limit values and operational optimization, e.g. replacement of parts is not really possible without knowledge of the predictive reliability, in other words the measure of quality.

SUMMARY OF INVENTION

An evaluation of the operating conditions of a machine or an installation, in which a trend in the further changes of parameters is analyzed, is very important in respect of problem solving in tasks such as operation monitoring or system analysis. These methods are used wherever extrapolations into unknown value ranges from known laws are of significance, in other words essentially when predicting events (identification of future alarms/exceeded load values) and damage prevention (identification of future damage).

As with measurement values, these are practically worthless without details of measurement tolerance, a variable must be associated with an extrapolation, allowing conclusions to be drawn about predictive quality (measure of quality). Without this information extrapolation results cannot be properly evaluated and decisions on follow-up actions (e.g. process interventions) are extremely unreliable and in some circumstances counterproductive.

The object of the invention is therefore to eliminate this problem.

This object is achieved by means of a method according to claim 1.

Further advantageous embodiments are listed in the subclaims.

Optimal adjustment of the extrapolation function in respect of the database is achieved not by a maximum correlation coefficient r but using a measure of quality K, which is independent of the gradient of a curve of adjustment in respect of a database.

The measure of quality K is calculated from at least two different subcriteria and this provides conclusions about the predictive quality of the extrapolation. The existence of K allows at least two extrapolation modes:

Predetermination of a constant measure of quality K

In this case the extent of the extrapolation, i.e. the distance between the last value in the database and an end point of the extrapolation, is variable.

This procedure is important when suppressing incorrect or insignificant alarms.

Here an operator or technical installation can be informed of the period for which no alarm will occur, i.e. a specific operational dependability is specified.

Predetermination of the extent of extrapolation (e.g. when a limit value is exceeded)

In this case K is variable. The change to K over time can in turn be used as a basis for a trend analysis, in order to estimate the probable time of occurrence of the event when K=1.

Trend analyses to evaluate the operating conditions of a machine or an installation can generally extrapolate the change in two correlated variables into unknown value ranges.

They can be applied both to changes over time $$y_i = f(t_i); i=1 \ldots n$$

Example $P_{el}=f(t)$; $P_{el}$=generator output and formally time-dependent associations $$y_{1i} = f(y_{2i}); i=1 \ldots n, y_1 \text{ synchronous with } y_2$$

Example $P_{el}=f(\text{fuel mass flow})$.

The use of trend analyses however implicitly assumes that conditions of laws that can be derived from the past for changes in two correlated variables also continue in the future and unknown value associations can be generated in this way. For meaningful tend analyses, this condition requires that these can only be generated with patterns which were generated under identical (standardized) basic conditions—physical environmental conditions, fuel, output, burner operating mode, etc. Value associations standardized in this way can be supplied either by data selection using logical conditions (discrete standardization) or using a process simulation model (analytical standardization), which can for example calculate all environment-dependent values back to ISO conditions.

BRIEF DESCRIPTION OF THE DRAWINGS

The figures show
FIG. 1 a database and extrapolation curve
FIG. 2 curves to determine $\Delta I$
FIG. 3 segmentation of a database
FIG. 4 a pattern over time of K
FIG. 5 a turbine with components
FIG. 6 a simplified diagram of a longitudinal section of a turbine and
FIG. 7 a turbine blade as a component.

DETAILED DESCRIPTION OF INVENTION

Figure 1:
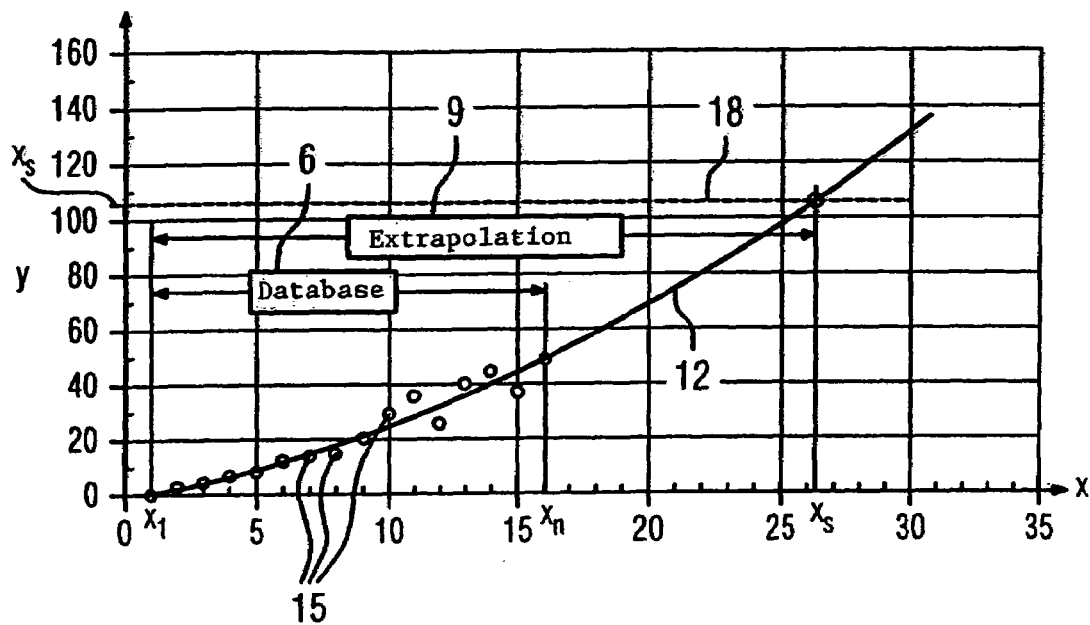

Basic variables for calculating measure of quality K

The measure of quality K is a measure of the quality of an extrapolation. It links a number of error influences and is therefore a function of at least two variables, e.g. V, $\Delta I$.

In this case these are for example a ratio V, an x uncertainty $\Delta I$, a continuity S and a time constant C:

$$K=f(V, \Delta I, S, C).$$

These variables are for example linked so that the value repertoire of K is within a standardized range, e.g. 0% to 100%.

Ratio V of the data range to the extrapolation range

There are n measurement points $(x_1, y_1)$ to $(x_n, y_n)$ available for the extrapolation. However not all the available measurement points 15 of a data repertoire 54 (FIG. 3) have to be used.

The ratio V for example inserts the x value range $(x_1-x_n)$ of the database 6 used for the extrapolation into the ratio of the distance $x_1$ to the x position of the extrapolation point $x_s$ used (FIG. 1), i.e. the extrapolation range 9, into a ratio, which for example aims as a maximum toward the value 1, i.e. the database 6 is equal to the extrapolation range and as a minimum toward the value 0, i.e. the database 6 is very small compared with the extrapolation interval. $X_s$ is for example a value, at which a limit value ($Y_s$=limit value) is exceeded.

FIG. 1 also shows an adjustment function 12 in respect of the database 6, which also gives the extrapolation to the x point $x_s$.

V is for example calculated as follows:

$$V=(x_n-x_1)/(x_s-x_1).$$

If V essentially contributes to a reduction in the measure of quality K, the database of the extrapolation can gradually be extended.

Uncertainty $\Delta I$ of the adjustment curve in the x direction

Every curve adjustment (condition for extrapolation) naturally also has an uncertainty (confidence range) of the curve parameter calculated.

Figure 2:
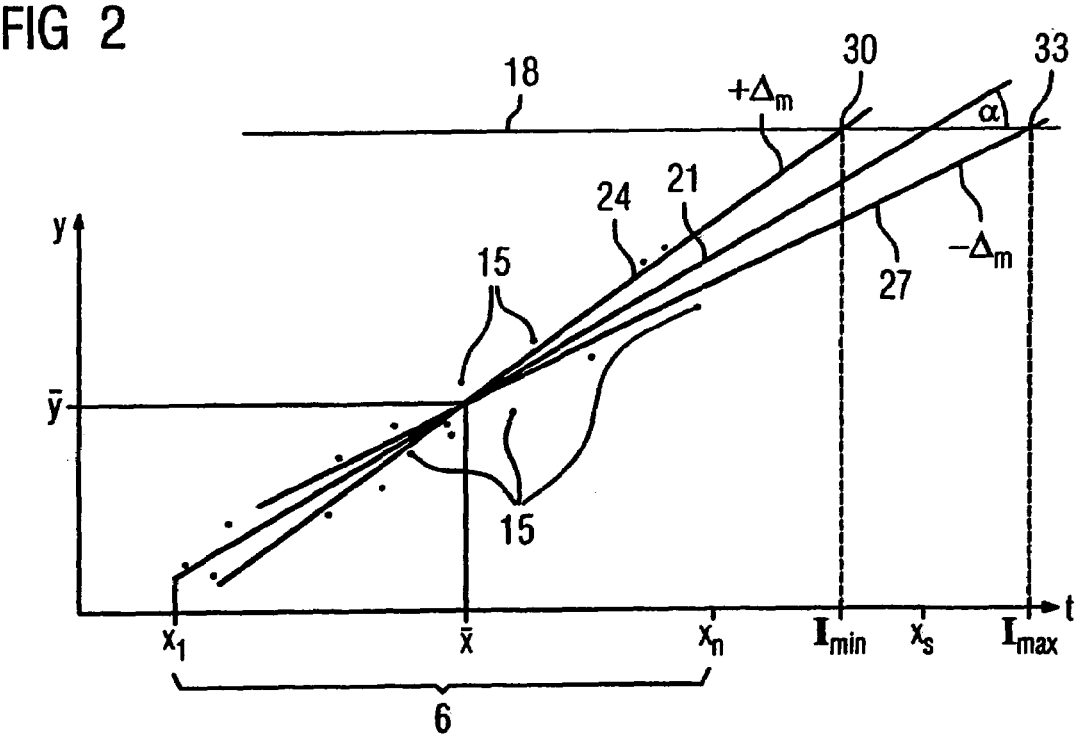

In order to determine the uncertainty of the gradient, in FIG. 2 for example a linear regression function 21 is used.

Generally all functions, which can be transferred to linear structures, can be used as extrapolation functions, i.e.

Linear function (master function)->$y=a_0+a_1*x$

Potency function->$\ln y=\ln a_0+a_1*\ln x$

Logarithmic function->$y=a_0+a_1*\ln x$

Exponential function->$\ln y=\ln a_0+a_1*x$ etc.

The uncertainty $\Delta I$ is then calculated as follows.

FIG. 2 shows an example of a database 6 with an extrapolation curve 21 and with further curves 24, 27 for calculating $\Delta I$.

The uncertainty $\Delta I$ can be illustrated by rotating the adjustment curve 21 (shown in a linear manner) about a point of rotation $(\bar{x},\bar{y})$.

The mean values $\bar{x}$ and $\bar{y}$ are for example determined by geometric or arithmetic means. The point $(\bar{x},\bar{y})$ does not necessarily have to lie on the linear adjustment curve 21 (extrapolation curve).

The uncertainty of a gradient of the linear curve 21 corresponds to an angular rotation, with which the gradient m changes by $\pm\Delta m$ and therefore an x uncertainty $\Delta I$ of the adjustment curve, in the x direction for example (FIG. 2).

Varying the gradient results in two further curves 24, 27, each of which has a point of intersection 30, 33 with a parallel 18 (ys=constant), which corresponds to a limit value. For each point of intersection 30, 33, there is a corresponding x value $I_{max}$ and $I_{min}$, whereby $I_{max}>I_{min}$ and $\Delta I=I_{max}-I_{min}$.

This x uncertainty correlates to an intersection angle $\alpha$, which is determined from the angle between the parallel 18 and the curve at the point of intersection of the extrapolation curve 21 and the parallel 18. The x uncertainty $\Delta I$ increases as the intersection angle $\alpha$ reduces.

If there is no limit value or no limit value is exceeded with an extrapolation, the above applies to the predetermined x end point ($x_s$) of the extrapolation and an imaginary parallel to the x axis, which runs through the point ($x_s$, $y_s$).

As the extrapolation function always exists analytically, the intersection angle $\alpha$ between a horizontal or alarm function and the extrapolation function can be calculated using the first derivative.

The approach to calculating the gradient uncertainty $\pm\Delta m$ is for example as follows:

A gradient b is determined by means of a confidence interval. Such a method is known from Kreyszig, Erwin: "Statistische Methoden und ihre Anwendungen" [Statistical methods and their applications], published by Vandenhoeck und Ruprecht, Göttingen, page 270.

The following procedure is used to determine the gradient b:

a) A database 6 is established. The database 6 comprises n correlated x and y values (FIG. 2).
b) Calculation of $\bar{x}$ and $\bar{y}$ of the database 6 and the variable $\Sigma x_i y_i$
c) Calculation of $$S_{xy} = \frac{1}{n-1}\left(\sum x_i y_i - \overline{nxy}\right) \quad (i = 1 \ldots n)$$

d) Calculation of $$S_x^2 = \frac{1}{n-1}\left(\sum x_i - \overline{x}\right)^2 \quad (i = 1 \ldots n)$$

e) Calculation of $$S_y^2 = \frac{1}{n-1}\left(\sum y_i - \overline{y}\right)^2 \quad (i = 1 \ldots n)$$

f) The gradient b is obtained from $$b = \frac{S_{xy}}{S_x^2}$$

g) Calculation of $$a = (n-1)(s_y^2 - b^2 s_x^2)$$

The following equation is obtained for the regression line 21

$$y = \overline{y} + b(x - \overline{x}).$$

Next a confidence factor of for example 95% is predetermined, i.e. $\gamma = 0.95$, from which a variable F(c) is calculated:

h) $F(c) = \frac{1}{2}(1 + \gamma) = 0.975$ i) With F(c)=0.975 and n−2 (n=number of measurement values) degrees of freedom, the t-distribution (student distribution) gives a value c
(0.975 corresponds to the integral of the t-distribution to the point x=c).
$\Delta m$ is obtained from j) $\dfrac{c\sqrt{a}}{S_x \sqrt{(n-1)(n-2)}}$ This gives an uncertainty of the gradient m:

$$b - \Delta m \leq m \leq b + \Delta m.$$

This calculates the x uncertainty $\Delta I$ of the gradient m in the point of rotation (FIG. 2) depending on the scatter variables of the current database 6.

As a result $\Delta I = f(\Delta m, \alpha)$ can be calculated using radiation or goniometry.

$\Delta I$ can be standardized similarly.

Continuity S of the y values in the database

Segmentation of a database 6 provides prior conclusions about the current direction of curvature of the database 6 used.

The database 6 is a true or false subset of a data repertoire 54 comprising all available measurement points 15.

Segmentation means that measurement points, i.e. numeric tuples (x,y) of the database 6 are divided into at least three segments 45, 48, 52. A linear adjustment curve 36, 39, 42 is determined for each segment 44, 48, 52.

The direction of curvature of the database 6 is determined by creating segment means g1, g2 and g3 and calculating the second numerical derivative.

With this method it can be assumed that the adjustment curve (extrapolation curve) is calculated cyclically from a floating database 6, i.e. a data window 3 (FIG. 3) of constant or variable length is displaced after each completed extrapolation cycle in the direction of increasing variables by a predetermined interval $\Delta x$ (independent variable) in each instance.

In practice the displacement $\Delta x$ of the data window 3, i.e. the database 6, can be effected to the maximum in the time cycle, with which new measurement values 15 are generated (e.g. $\Delta x = 5$ s).

The concept of continuity S in this context is not to be understood as a mathematical definition but as a measure of the change in the point pattern of the database 6 in relation to the last completed extrapolation stage.

In order to be able to make a statement about the continuity of the Y value change and therefore implicitly a statement about the extrapolability of the change, the data window 3 (FIG. 3) is divided into at least three segments 45, 48, 52. In an intermediate stage, a mean and a linear adjustment function $y_1, y_2, y_3$ with the gradients $c_1, c_2, c_3$ are calculated for each segment 45, 48, 52 (FIG. 3).

If the means of the three regression lines 36, 39, 42 are designated as $g_1, g_2$ (middle segment) and $g_3$, the current direction of curvature of the gradient pattern can be determined with the numerical curvature measurement p $$p = g_1 - 2^* g_2 + g_3.$$

Figure 3:
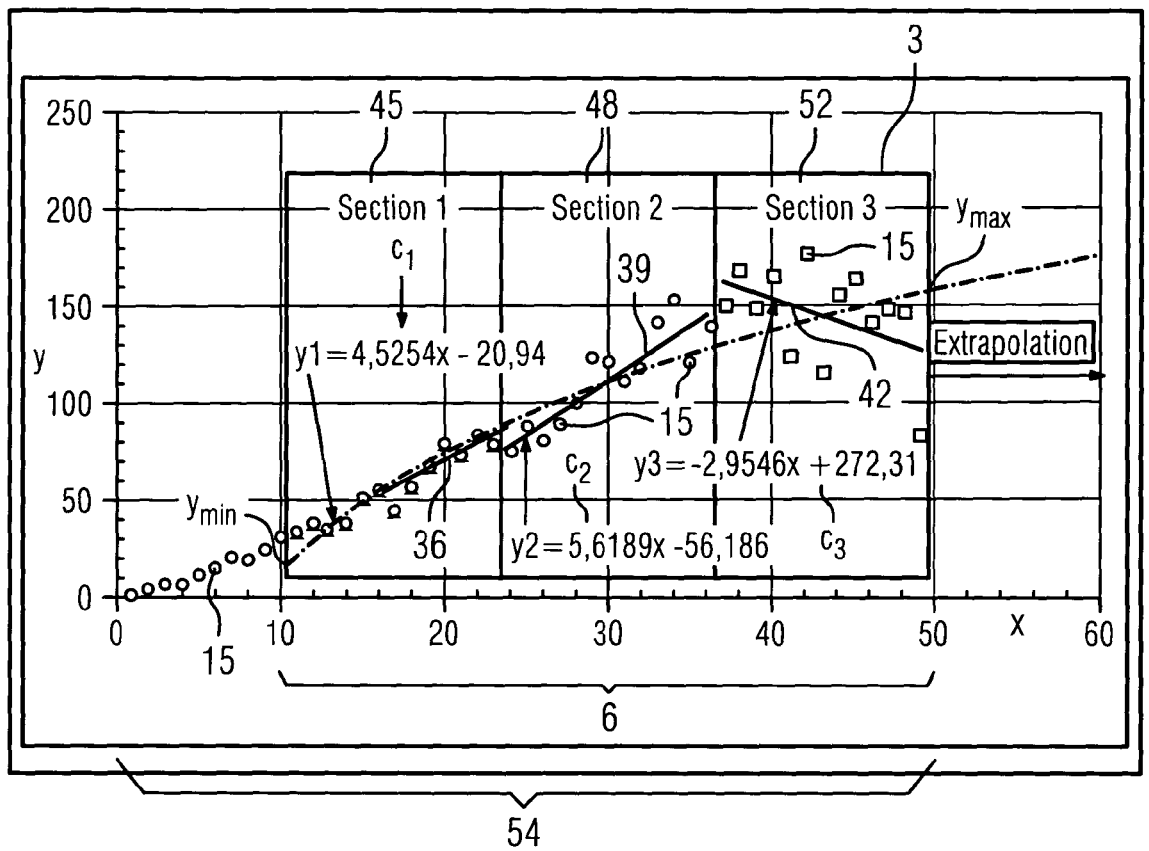

In the example in FIG. 3 q is negative. This means a right curvature.

With p=0 the three means lie on a straight line. From a curve repertoire, that curve type is adjusted iteratively in respect of the value range of the entire current database.

Adjustment functions (regression functions) of the curve repertoire for the extrapolation curve for data correlations have to satisfy the monotonous pattern condition, as non-monotonous functions can result in significant extrapolation uncertainties. Generally all functions which can be transferred to linear structures of the form $y = a_0 + a_1^* x$ can be used, i.e.

Linear function (master function)->$f(x) = y = a_0 + a_1^* x$

Potency function->$f(x) = \ln y = \ln a_0 + a_1^* \ln x$

Logarithmic function->$f(x) = y = a_0 + a_1^* \ln x$

Exponential function->$f(x) = \ln y = \ln a_0 + a_1^* x$ etc.

The curve type selected from the curve repertoire must satisfy the following conditions:
the direction of curvature of the extrapolation curve (regression lines) must correspond to that of p;
the quotient $Q_k$ of numerator=mean (weighted if necessary) of the distance squares between measurement values and extrapolation curve, and denominator=mean square of the y value range of the extrapolation curve in the area of the data window (here for example $y^2 mitt_k=[(y\ max_k+y\ min_k)/2]^2$, where y max is the maximum Y value and y min correspondingly is the minimum Y value of the kth curve) and is used for standardization) must be minimal;

$$Q_k = f(k) = \frac{\sum w_i * (y_i(x_i) - f_k(x_i))^2}{y^2_{mitt_k} * \sum w_i}$$

where k is a numerator of the available extrapolation curve types (curve repertoire)

$Y_i(x_i)$ is the measurement value at point $x_i$ $f_k(x_i)$ is the function value of the kth extrapolation curve type at point $x_i$ $w_i$ is a weighting factor for each individual measurement value or for all measurement values of a segment.

The continuity S is evaluated as follows:

Comparison of the three straight line gradients $C_1$, $C_2$, $C_3$ with the gradients of the extrapolation curve at the respective middle positions ($X_{s1}$, $X_{S2}$, $X_{S3}$) of the three segments of the data window. A different weighting of the three gradient differences is possible and expedient here. In this way the more current values in the last segment can be evaluated more stringently, in order to identify a change in the curve pattern more rapidly.

The three gradient differences are a measure of the continuity of change in the curve pattern.

S is calculated as follows:

$O_1$ to $O_3$ are the three gradients of the selected kth adjustment curve 36, 39, 42 in relation to the half segment width in each instance, $C_1$ to $C_3$ the gradients of the linear segment adjustments (FIG. 3).

The following therefore applies:

$$S = \frac{\sum \gamma_i * (C_i - O_i)^2}{\sum \gamma_i}; i = 1 \ldots 3$$

(segment areas)

with γi: weighting factors 1 . . . n.

The value range of S is as follows: 0 (abs. continuity), i.e. the gradients of the extrapolation function in the segment centers are identical to the regression lines of the individual segments 45, 48, 52 to +∞. i.e. no gradient correspondence.

Time constancy C of the extrapolations

The time variance of a sequence of extrapolations is an additional and important indicator of predictive dependability, as high variance totals for example of the measure of quality can testify to non-stable extrapolation conditions and therefore questionable significance.

The time constancy of an extrapolation can be requested when a fixed measure of quality is predetermined with a variable extent of extrapolation ($X_s$) or when the extent of extrapolation is fixed—e.g. $X_s$ can correspond to an exceeded fixed limit value—via the then variable confidence factor.

Figure 4:
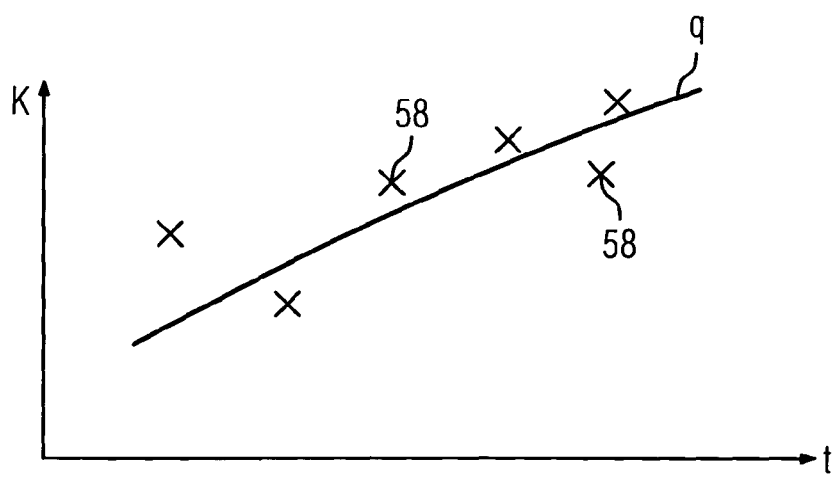

FIG. 4 shows an example of the time pattern of the measure of quality K(t) with different values 58. For this value pattern an adjustment function q is determined from a curve repertoire.

The respective variables are calculated iteratively, e.g. using the Newton method.

Variances are monitored over time using a regression fit (e.g. by a polynomial 1 or higher order, with the order dependent on n) in respect of the last n (e.g. n=10) time values for extent of extrapolation or confidence factor. In this way values for the variables to be tested, which change in a linear manner over time, can be evaluated with precision in their variability.

The evaluation of the time variance of the extent of extrapolation is calculated as follows:

$$C = \frac{\sum \gamma_i * (K(t_i) - q(t))^2}{q^2_{mitt_K} * \sum \gamma_i}$$

i=number of iterations.

Here too weighting factors $\gamma_i$ can evaluate the most current values as different from/higher than the oldest.

Here $q^2 mitt_k$ corresponds to $y^2 mitt_k$.

The value range for C is between C=0 (no temporal scatter of variables, all variable points are on the regression line) and +∞ (variable sequence degraded).

Linking of V, $\Delta 1_{norm}$, S and C to measure of quality K

The measure of quality K links the variables V, $\Delta 1_{norm}$, S and C for example as follows:

$$K = \frac{V * \Delta I}{S * C}.$$

The value range of K is between 0 (extrapolation distorted) and +∞ (extrapolation exact).

K can for example be standardized by means of a non-linear equation:

$$K_{norm} = 1 - e^{-k}.$$

The installation is for example a rotor of a gas turbine. By determining K of the frequency of rotor parameter, it is ascertained that in a specific period (xs−xn) a limit value will be exceeded without permission. The frequency is therefore controlled downwards.

Figure 5:
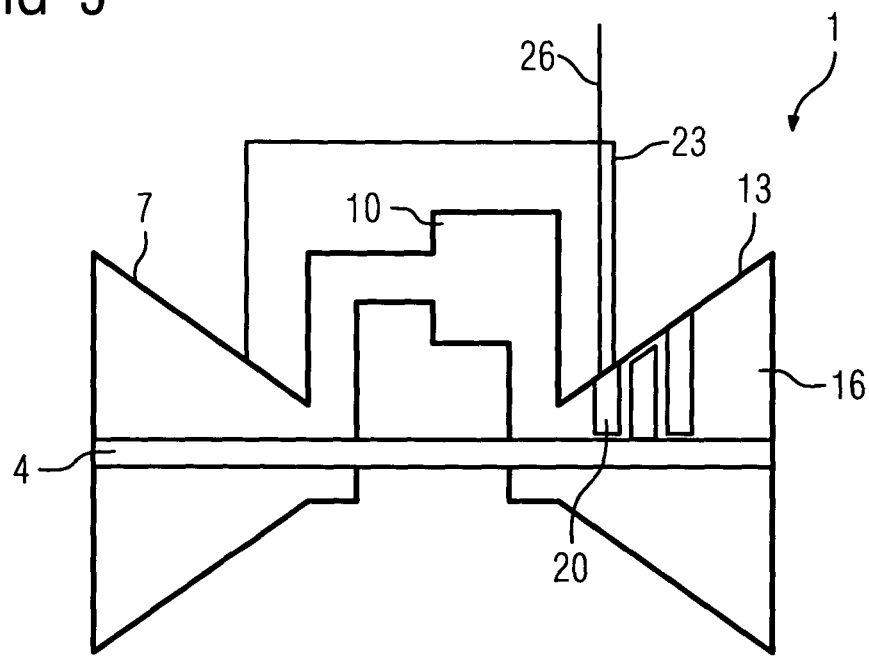

FIG. 5 shows a diagram of a longitudinal section of a gas turbine 1.

A gas turbine 1 is selected as an example of a component for a machine, in which parameters such as temperature, vibration, electrical power or other parameters are measured.

A compressor 7, combustion chamber 10 and turbine component 13 are arranged one behind the other along a shaft 4. The turbine component 13 has a hot gas duct 16. Fixed turbine blades 20 are arranged in the hot gas duct 16. Fixed blade and runner blade limits are arranged alternately one after the other.

The turbine blades 20 and 20' are for example cooled by means of a combined air and/or steam cooling system. For this compressor air is for example taken from the compressor 7 and fed into the gas duct 16 via an air supply system 23. Steam is also fed, for example, via a steam supply system 26.

Figure 6:
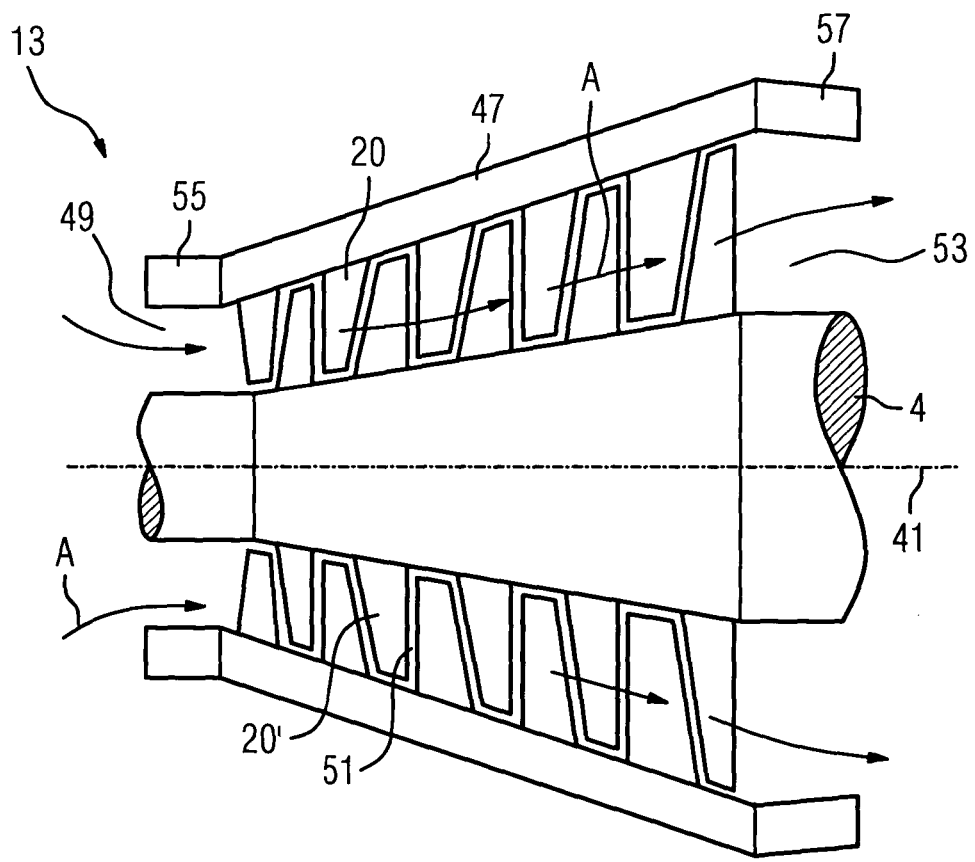

FIG. 6 shows a simplified diagram of the longitudinal section of a turbine component 13. The turbine component 13 has a shaft 4, which extends along an axis of rotation 41.

The turbine component 13 also has an inflow area 49, a blade area 51 and an outflow area 53 one after the other along the axis of rotation 41.

Rotatable runner blades 20' and fixed blades 20 are arranged in the blade area 51. The runner blades 20 are attached to the shaft 4, while the blades 20 are arranged on a guide blade support 47 around the shaft 4.

A ring-shaped flow duct for a flow medium A, e.g. hot steam, is formed by the shaft 4, the blade area 51 and the guide blade support 47. The inflow area 49 used to feed in the flow medium A is limited in a radial direction by an inflow housing 55 arranged upstream from the guide blade support 47.

An outflow housing 57 is arranged downstream on the guide blade support 47 and limits the outflow area 53 in a radial direction, i.e. perpendicular to the axis of rotation 41. During the operation of the gas turbine 1, the flow medium A flows from the inflow area 49 into the blade area 51, where the flow medium works subject to expansion, and then leaves the gas turbine 1 via the outflow area 53. The flow medium A is then collected in a condenser (not shown in more detail in FIG. 5) for a steam turbine beyond the outflow housing 57.

As it flows through the blade area 51 the flow medium A expands and works on the runner blades 20, causing these to rotate.

Figure 7:
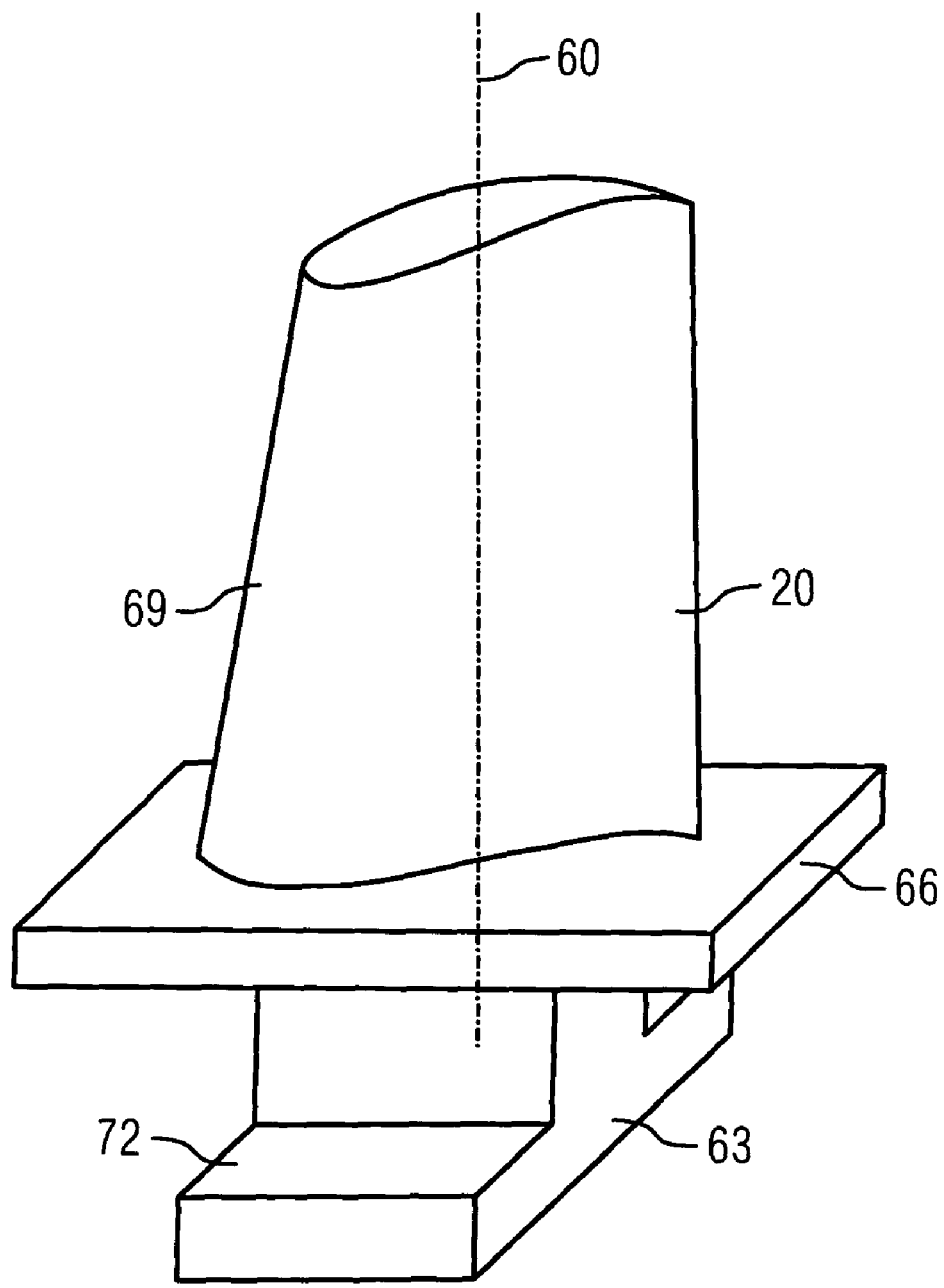

FIG. 7 shows a perspective view of a runner blade 20, which extends along a radial axis 60. The runner blade has an attachment area 63, an adjacent blade platform 66 and a blade paddle area 69 one after the other along the radial axis 60.

A blade foot 72 is formed in the attachment area 63 and is used to attach the blade 20 to the shaft 4 of a gas turbine 1. The blade foot 72 is for example configured as a hammer head.

With conventional runner blades 20 solid metal materials are used in all areas 63, 66, 69. The runner blades 20 can be manufactured using a casting method, a forging method, a milling method or combinations of these. The component frequently exhibits defects immediately after manufacture.

The invention claimed is:

1. A method for the evaluating and modifying the operating conditions of a machine or an installation, comprising the steps of:
    measuring at least one parameter a number of times to create a database, which comprises values $(x_1,y_1)$ to $(x_n,y_n)$ of the parameter;
    determining an extrapolation range, $x_s$;
    performing an extrapolation in the range $x_s$;
    determining a measure of quality, K, of the extrapolation calculated on the basis of the database wherein K is a function of at least two variables taken from the group consisting of V, ΔI, S, C, with V being a ratio of the value range of the database to the extrapolation range, $x_s$ which is determined by $x_s > x_1$, $x_n$ with ΔI being the x uncertainty of the adjustment curve in the x direction, with S being continuity as a measure of the change in the y values in the database and with C being the time constancy of the extrapolation; and
    controlling the parameter value so that the value will be retained within a limit,
    wherein the evaluation of the operating conditions is used to optimize the operation of the machine or the installation.

2. A method according to claim 1, wherein the value of the parameter is controlled based on the measure of quality K.

3. A method according to claim 2, wherein the evaluation of the operating conditions increases the operational dependability of the machine or the installation, by influencing the parameter accordingly based on the measure of quality K.

4. A method according to claim 2, wherein evaluation of the operating conditions and controlling the parameter value optimizes operation of the machine or the installation.

5. A method according to claim 1, wherein the optimization is effective to increase the operational dependability of the machine or the installation, by influencing the parameter accordingly based on the measure of quality K.

6. A method according to claim 5, wherein a limit value is predetermined for the parameter and a period is determined in which the limit value of the parameter is not to be exceeded.

7. A method according to claim 1, wherein the variables are selected so that the measure of quality K does not depend on the gradient of an adjustment curve in respect of the database.

8. A method according to claim 1, wherein the measure of quality K is standardized, in particular by $1-e^{-K}$.

9. A method according to claim 8, wherein the measure of quality K is standardized to a value range of 0 to 100%.

10. A method according to claim 1, wherein the measure of quality K is defined by:

$$K = \frac{V * \Delta I}{S * C}.$$

11. A method according to claim 9, wherein the ratio V of the value range of the database is defined by $(x_l - X_1)/(x_s - x_1)$.

12. A method according to claim 1, wherein the ratio V of the value range of the database is defined by $(x_n - x_1)/(x_s - x_1)$.

13. A method according to claim 1, wherein:
    the database is divided into at least three segments;
    a mean value $g_1, g_2, g_3$ and a linear adjustment function $y_1, y_2, y_3$ with gradients $c_1, c_2$ and $c_3$ are each calculated for each segment from the database;
    a numerical curvature measure p, whereby $p = g_1 - 2*g_2 + g_3$ is calculated, which reflects the current direction of curvature of the gradient pattern;
    from a curve repertoire of curve types at least of the group:

Linear function $\to f(x) = y = a_0 + a_1 * x$

Potency function $\to f(x) = \ln y = \ln a_0 + a_1 * \ln x$

Logarithmic function $\to f(x) = y = a_0 + a_1 * \ln x$

Exponential function $\to f(x) = \ln y = \ln a_0 + a_1 x$ that curve type of the adjustment function is selected iteratively and adjusted in respect of the value range of the entire current database, with the curve type selected from the curve repertoire having to satisfy the following conditions;
    the direction of curvature of the curve, which is determined from the extrapolation, must correspond to that of p and the quotient $Q_k$ of numerator and denominator must be minimal:

$$Q_k = f(k) = \frac{\Sigma w_i * (y_i(x_i) - f_k(x_i))^2}{y^2_{mitt_k} * \Sigma w_i} = \min(i = 1 \ldots \min)$$

where k is a numerator of the available extrapolation curve types in particular $y^2 mitt_k = [(y\ max_k + y\ min_k)/2]^2$, with $Y_i(x_i)$ being the measurement value at point $x_i$, with $f_k(x_i)$ being the function value of the kth extrapolation curve type at point $x_i$, with $w_i$ being a weighting factor for each individual measurement value or for all measurement values of a segment;

so that the continuity S is calculated as follows:

$$S = \frac{\Sigma \gamma i * (C_i - O_i)^2}{\Sigma \gamma_i};$$

with i=1 . . . 3 being the numbering for the segment areas, with $\gamma_i$: *weighting factors* 1 . . . n, with $O_1$ to $O_3$ being the gradients of the selected kth curve for the extrapolation in respect of each half segment width, and with $C_1$ to $C_3$ being the gradients of the linear segment adjustments.

14. A method according to claim 13, wherein the value range of continuity S is in the range 0 and $+\infty$.

15. A method according to claim 1, wherein determination of the x uncertainty includes:

selection of an extrapolation function, which can be transferred to linear structures from the group consisting of Linear function->$y = a_0 + a_1 * x$ Potency function->$\ln y = \ln a_0 + a_1 * \ln x$ Logarithmic function->$y = a_0 + a_1 * \ln x$ Exponential function->$\ln y = \ln a_0 + a_1 * x$, determination of a database, with the database comprising n correlated x and y values Calculation of $\bar{x}$ and $\bar{y}$ of the database and the variable $\Sigma x_i y_i$, Calculation of $$S_{xy} = \frac{1}{n-1}\left(\sum x_i y_i - \overline{nxy}\right) (i = 1 \ldots n)$$

Calculation of $$S_x^2 = \frac{1}{n-1}(\Sigma x_i - \bar{x})^2 (i = 1 \ldots n)$$

Calculation of $$S_y^2 = \frac{1}{n-1}(\Sigma y_i - \bar{y})^2 (i = 1 \ldots n)$$

Calculation of a gradient $$b = \frac{S_{xy}}{S_x^2}$$

Calculation of $$a = (n-1)(S_y^2 - b^2 s_x^2)$$

Determination of an equation for a regression line $$y = \bar{y} + b(x - \bar{x})$$

with a confidence factor $\gamma$, a variable F(c) is calculated according to $$F(c) = \frac{1}{2}(1 + \gamma),$$

with F(c) and n–2, n=number of measurement values, degrees of freedom, the t-distribution gives a value c, Determination of $\Delta m$ $$\frac{c\sqrt{a}}{S_x\sqrt{(n-1)(n-2)}}$$

which gives an uncertainty of the gradient m:

$b - \Delta m \leq m \leq b + \Delta m$,

Determination of the straight line equations with the gradients $b - \Delta m$, $b + \Delta m$, Determination of the points of intersection ($I_{min}$, constant) and ($I_{max}$, constant) of the straight line with a parallel (y=constant), which corresponds to a limit value, Determination of corresponding x values $I_{max}$ and $I_{min}$, where $I_{max} > I_{min}$, Calculation of $\Delta I = I_{max} - I_{min}$.

16. A method according to claim 1, wherein the measure of quality K changes over time and an evaluation of the time variance of the extent of extrapolation C is calculated as follows:

$$C = \frac{\sum \gamma_i^*(K(t_i) - q(t))^2}{q_{\min_K}^2 * \Sigma \gamma_i}$$

with i being the number of iterations, $q^2 \text{mitt}_K = [(q\ \max_K + q\ \min_K)/2\ ]^2$ with $\gamma_i$ being a weighting factor.

* * * * *